(12) United States Patent
Simske et al.

(10) Patent No.: US 7,068,855 B2
(45) Date of Patent: Jun. 27, 2006

(54) SYSTEM AND METHOD FOR MANIPULATING A SKEWED DIGITAL IMAGE

(75) Inventors: Steven J. Simske, Fort Collins, CO (US); Jeffrey P. Lee, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 696 days.

(21) Appl. No.: 10/197,928

(22) Filed: Jul. 16, 2002

(65) Prior Publication Data

US 2004/0013318 A1    Jan. 22, 2004

(51) Int. Cl.
*G06K 9/36* (2006.01)

(52) U.S. Cl. ...................... 382/289; 382/289

(58) Field of Classification Search ............... 382/287, 382/289, 293, 295, 296, 305, 312, 297
See application file for complete search history.

(56) References Cited

U.S. PATENT DOCUMENTS

| | | | |
|---|---|---|---|
| 5,101,448 A * | 3/1992 | Kawachiya et al. | 382/287 |
| 5,181,260 A * | 1/1993 | Kurosu et al. | 382/289 |
| 5,452,374 A * | 9/1995 | Cullen et al. | 382/293 |
| 5,708,513 A | 1/1998 | Hasuo et al. | |
| 5,901,253 A * | 5/1999 | Tretter | 382/289 |
| 5,912,448 A | 6/1999 | Sevier et al. | |
| 5,974,199 A * | 10/1999 | Lee et al. | 382/289 |
| 6,005,683 A | 12/1999 | Son et al. | |
| 6,064,778 A * | 5/2000 | Pasco et al. | 382/289 |
| 6,282,326 B1 * | 8/2001 | Lee et al. | 382/289 |
| 6,310,984 B1 | 10/2001 | Sansom-Wai et al. | |
| 6,360,026 B1 | 3/2002 | Kulkarni et al. | |
| 6,373,590 B1 * | 4/2002 | Ancin et al. | 358/1.18 |
| 6,433,896 B1 | 8/2002 | Ueda et al. | |
| 6,785,428 B1 * | 8/2004 | Stolin | 382/295 |

FOREIGN PATENT DOCUMENTS

| | | | |
|---|---|---|---|
| EP | 0949802 A3 | 10/1999 | |
| EP | 1184808 A3 | 3/2002 | |

* cited by examiner

*Primary Examiner*—Kanjibhai Patel (57) ABSTRACT

An image-processing system comprising an image-acquisition device configured to generate a representation of a source object, the representation comprising a plurality of pixels, a processor communicatively coupled to the image-acquisition device, and a memory element communicatively coupled to the processor, the memory element comprising logic configured to determine when the source object is skewed in the representation, and logic configured to identify the borders of an orthogonal portion of the representation responsive to the logic configured to determine, wherein the orthogonal portion comprises unaltered pixels that contain information corresponding to the source object. A method for presenting a representation of a source object comprises acquiring a representation of a source object, the representation formed by a plurality of pixels, identifying the vertices of the source object within the representation, determining if the representation is skewed, calculating a skew angle in response to determining that the representation is skewed, and deriving the borders of the largest orthogonal portion of the representation that comprises unaltered pixels corresponding to the source object.

22 Claims, 7 Drawing Sheets

SYSTEM AND METHOD FOR MANIPULATING A SKEWED DIGITAL IMAGE

TECHNICAL FIELD

The present invention generally relates to digital-image processing and, more particularly, to a system and method for manipulating a skewed digital image.

BACKGROUND OF THE INVENTION

Until recently, real-time editing of digital images was feasible only on expensive, high-performance computer workstations with dedicated, special-purpose, hardware. The progress of integrated-circuit technology in recent years has produced microprocessors with significantly improved processing power and reduced the cost of memory. These developments have made it feasible to implement image-editing techniques in personal computers.

Software is commercially available with a graphical-user interface (GUI) for selecting and editing a digitally-generated image in a number of ways. For example, to "cut" or delete a portion of the image, the user can employ a mouse to select an area of the image by clicking the left mouse button while the screen "cursor" is located on a corner of the image that is desired to be deleted, dragging the screen "cursor" with the mouse to another corner, thereby outlining a portion or all of the image. Some other image editors permit an operator to enter multiple points defining a polygon having greater than four sides. Image-processing algorithms are then selectively applied over the pixels associated with the polygon.

Regardless of the shape of the selected region, once the user has defined a region of the image, the user then completes the "cut" by either selecting the "cut" command from a drop-down menu (using his mouse and/or a keyboard), or alternatively, by using his mouse to select and activate a GUI "cut" button or icon. In either case, known image-editing software is invoked which performs the "cut" operation, resulting in the original image being replaced by an edited image which has a blanked-out area enclosed by the boundaries of the region so selected.

When a scanner scans a source object (i.e., a photograph, or a text document), a digital image of the original source object is typically generated. The digital image often is stored as a raster or bitmap image. The raster or bitmap image is usually represented in a digital image-processing system by a rectangular grid of pixels, where the pixel is a basic discrete unit for defining bitmap images and has a defined location and color value. A 24-bit digital-image system may be defined by three channels comprising of red (R), green (G), and blue (B), where each channel of color contains 8 bits of information with a range of 0 to 255.

Digitally-stored images may become-skewed during the scanning process, which converts the source object (e.g., a document or a photograph) into binary information that can be processed by an imaging system and/or a computer system. The bitmap image will be skewed if the source object is skewed relative to the scanner platen or when the source object is misaligned by an automatic page feeder, before the scanning operation. Another way that the bitmap image might be skewed relative to the grid of pixels is where the original image is skewed with respect to the paper. This may occur if the image is photocopied and the copy is used as the source object (i.e., the skewed copy is scanned). An image that is skewed during the photocopying process will remain skewed after scanning assuming that the copied source is correctly aligned with the scanner platen and the platen and image sensor are aligned.

When an acquired digital image of the source object is skewed or rotated inside the entire scan image (i.e., inside the entire digital image obtained from the scanner), the acquired digital image typically includes an image of the source content (i.e., the photograph or text of a document), as well as extraneous information (e.g., an image of the underside of a cover from a flatbed scanner). Generally, image rectangles, formed by image acquisition software, are configured with the intention to capture all of the source information within the confines of the image rectangle. If the source is skewed (i.e., misaligned with respect to the rectangular grid), the edges of the digitally-stored image rectangle will generally contain triangular borders of background information.

The background information is introduced because typical scanners traverse the entire available scan region regardless of the size and orientation of the source object on the scanner platen. The resulting bitmap image includes both an image of the source object and extraneous background pixels. This extraneous background information is included in the acquired digital image when the size of the source is relatively small in comparison to the scan region of the scanner. Generally, an operator of the imaging system does not need or desire the background pixels. Furthermore, the extraneous background information is unsightly and increases the data storage capacity required to process and permanently retain the image data. Not only does the extraneous background information within the image rectangle affect the processing throughput of uncompressed image data, but many commonly-used data compression algorithms do not efficiently handle discontinuities such as those that can be expected between the border of a scanned photograph and the extraneous background information. It is known that significant data storage savings can be realized by removing discontinuities from regions in a digital image prior to compressing the digital information.

Prior techniques have been developed to try to detect and correct skewed images. For example, U.S. Pat. No. 4,941,189, entitled, "Optical Character Reader with Skew Recognition," issued on Jul. 10, 1990, describes a skew correction technique that searches for text characters along a scan line. Another example, U.S. Pat. No. 5,452,374, entitled, "Skew Detection and Correction of a Document Image Representation," issued on Sep. 19, 1995, describes another technique that segments the scan image into text and non-text regions and then determines the skew from the resulting segmentation. These techniques are insufficient to detect and correct skewed images of scanned photographs. In addition, because photographs can have a variety of sizes and shapes, it is typically difficult to trim the background information from the scanned image of a photograph.

Several techniques have been proposed that detect the skew of a scanned image without requiring the presence of text in the scanned image. One such technique is described in U.S. Pat. No. 5,093,653, entitled, "Image Processing System Having Skew Correction Means," issued on Mar. 3, 1992. Another such technique is described in U.S. Pat. No. 4,533,959, entitled, "Picture Processing Apparatus," issued on Aug. 6, 1985. However, these techniques require either human intervention (e.g., U.S. Pat. No. 5,093,653) or special skew detection marks on the original document (e.g., U.S. Pat. No. 4,533,959).

Improvements to the techniques described in U.S. Pat. No. 5,093,653 and U.S. Pat. No. 4,533,959 are described in U.S. Pat. No. 6,310,984 entitled, "Image Processing System With Image Cropping and Skew Correction," issued on Oct. 30, 2001 and in U.S. Pat. No. 6,360,026, entitled, "Method for Determining a Skew Angle of a Bitmap Image and Deskewing and Auto-Cropping the Bitmap Image," issued on Mar. 19, 2002. These approaches to removing the background information from the scanned image are computationally intensive and often result in a deskewed image of diminished quality.

SUMMARY OF THE INVENTION

An embodiment of a system comprises an image-acquisition device configured to generate a representation of a source object, the representation comprising a plurality of pixels, a processor communicatively coupled to the image-acquisition device, and a memory element communicatively coupled to the processor, the memory element comprising logic configured to determine when the source object is skewed in the representation, and logic configured to identify the borders of an orthogonal portion of the representation responsive to the logic configured to determine, wherein the orthogonal portion comprises unaltered pixels that contain information corresponding to the source object.

An embodiment of a method comprises acquiring a representation of a source object, the representation formed by a plurality of pixels, identifying the vertices of the source object within the representation, determining if the representation is skewed, calculating a skew angle in response to determining that the representation is skewed, and deriving the borders of the largest orthogonal portion of the representation that comprises unaltered pixels corresponding to the source object.

BRIEF DESCRIPTION OF THE DRAWINGS

Components in the drawings are not necessarily to scale. Emphasis instead is placed upon clearly illustrating the principles of the present invention. Moreover, in the drawings, like reference numerals designate corresponding parts throughout the several views.

DETAILED DESCRIPTION

Embodiments of the present invention relate to automating the process of identifying a skewed source object and determining coordinates that can be used to create a processed digital image devoid of extraneous information, while retaining image content contained in pixels from the originally-scanned source. Because slight skews are in general difficult to perceive when an operator of an image processing system reviews a scanned photograph, embodiments of the invention use the skew angle to identify the largest orthogonal region (i.e., in alignment with the image processing system) within the content of the scanned image. The orthogonal region is then presented to an operator as the default scanned image.

Some embodiments use an algorithm that is applicable for skew angles ranging from −45 degrees to 45 degrees. In practice, the algorithm can be limited to a skew angle having an absolute value smaller than 45, based upon, for example, operator feedback from users as to the maximum skew angle above which automatic skew correction is preferred. The somewhat reduced image rectangle may be presented to an operator of the image processing system as a "default" source image that avoids the drawbacks associated with deskewing (i.e., rotating or otherwise distorting the pixel information) a skewed bitmap, while at the same time, removing undesired extraneous (e.g., scan cover or background) pixels from the default source image.

Figure 1:
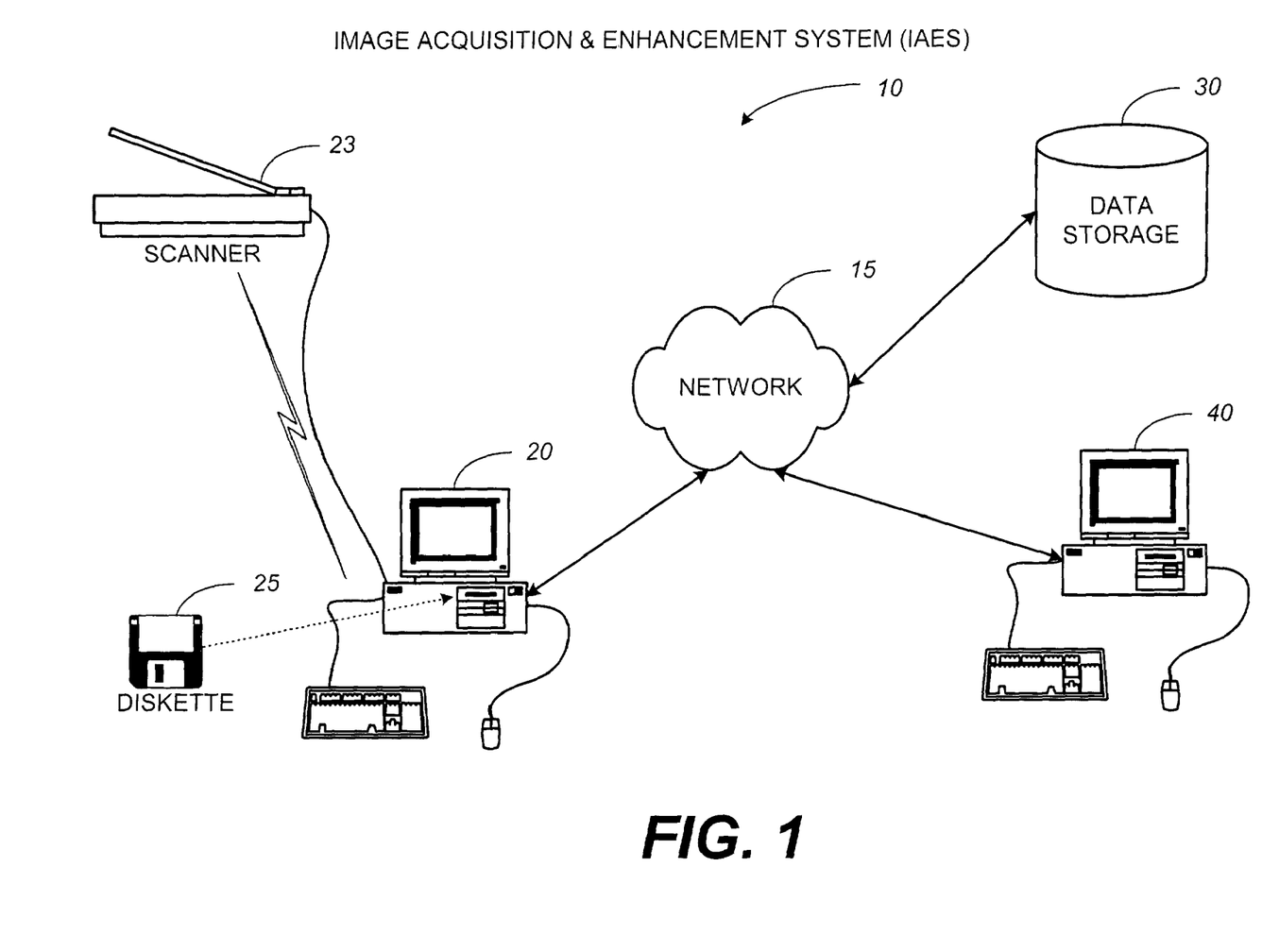
FIG. 1 is a schematic diagram of an embodiment of an image acquisition and enhancement system.

Referring now in more detail to the drawings, in which like numerals indicate corresponding parts throughout the several views, FIG. 1 presents a schematic diagram of an embodiment of an image acquisition and enhancement system. The image acquisition and enhancement system (IAES) 10 comprises a general-purpose computer 20, a data-storage device 30, and a workstation 40. The general-purpose computer 20, the data-storage device 30, and the workstation are communicatively coupled with each other via the network 15. In an alternative embodiment, the IAES 10 may be constructed of a composite device comprising the general-purpose computer 20, the data-storage device 30, and the workstation 40. In still other embodiments, the IAES 10 may comprise a composite device formed from a subset of the general-purpose computer 20, the data-storage device 30 and the workstation 40.

The image acquisition and enhancement system (IAES) 10 includes at least one image-acquisition device (e.g., the scanner 23) shown communicatively coupled to general-purpose computer 20. As shown in FIG. 1, the general-purpose computer 20 may receive images directly via a wired or a wireless interface associated with the scanner 23. It will be appreciated that scanner 23 may be a commercially-available scanner or other capture device(s) that "scan" or sequentially process a plurality of picture elements or pixels from a source, and may be a facsimile machine, copier, digital camera, or other image capture device now known or later developed. Alternatively, or in addition, the general-purpose computer 20 may receive images indirectly by way of various portable data-storage media such as floppy disk 25. It will be understood by those skilled in the art that a host of other portable data-storage media may also be used to transfer one or more images to the general-purpose computer 20 or the workstation 40. Some popular data-storage media suitable to transfer images include compact disks (CDs), magnetic tapes, and portable-hard drives. It will be further understood that once an image is acquired and received by a network-coupled device that various data-storage management systems and methods may be used to communicate and/or store the acquired image. Images that may be processed by the IAES 10 include, for example, scanned images, digital photographs, video, medical images, etc.

The embodiment of IAES 10 as described below is particularly adapted for "automatically" cropping digital images generated by scanning photographs. While the examples that follow illustrate this particular embodiment, it should be understood that IAES 10 is not limited to applying the described methods solely on scanned photographs. For example, the improved digital-imaging processing system may be configured to manipulate maps, medical images, and images of text and photographs (as commonly arranged in magazine and newspaper formats), etc. Furthermore, it should be understood the system and method may be integrated with various image acquisition and processing devices as may be desired.

Figure 2:
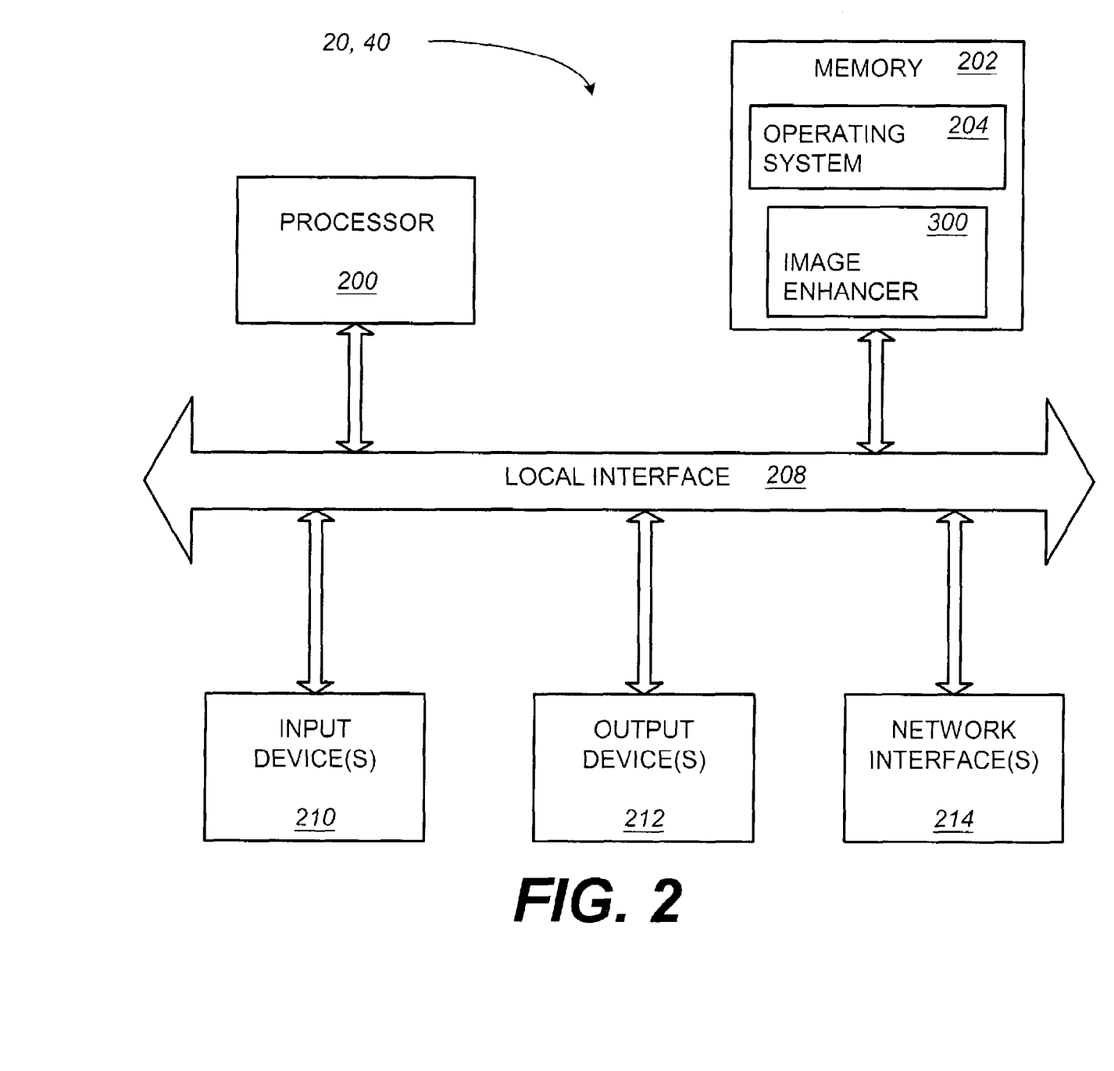
FIG. 2 is a block diagram illustrating an embodiment of the general-purpose computer of FIG. 1.

FIG. 2 presents a functional block diagram illustrating an embodiment of the general-purpose computer 20 and the workstation computer 40 of the IAES 10. The computing devices 20, 40 include a processor 200, input device(s) 210, output device(s) 212, network interface device(s) 214, and a memory 202 that communicate with-each other via a local interface 208. The local interface 208 can be, but is not limited to, one or more buses or other wired or wireless connections, as is known in the art or that may be later developed. The local interface 208 may include additional elements, such as buffers (caches), drivers, and controllers (omitted here for simplicity), to enable communications. Further, the local interface 208 includes address, control, and data connections to enable appropriate communications among the aforementioned components.

In the embodiment of FIG. 2, the processor 200 is a hardware device for executing software stored in memory 202. The processor 200 can be any custom-made or commercially-available processor, a central-processing unit (CPU) or an auxiliary processor associated with the computing devices 20, 40, or a semiconductor-based microprocessor (in the form of a microchip) or a macroprocessor.

The input device(s) 210 may include, but are not limited to, a keyboard, a mouse, or other interactive-pointing devices, voice-activated interfaces, or other operator-machine interfaces (omitted for simplicity of illustration) now known or later developed. The input device(s) 210 can also take the form of an image-acquisition device (e.g., the scanner 23) or a data file transfer device (i.e., a floppy-disk drive). Each of the various input device(s) 210 may be in communication with the processor 200 and/or the memory 202 via the local interface 208. Data received from an image-acquisition device connected as an input device 210 or via the network interface device(s) 214 may take the form of a plurality of pixels, or a file.

The output device(s) 212 may include a video interface that supplies a video-output signal to a display monitor associated with the respective computing devices 20, 40. Display devices that can be associated with the respective computing devices 20, 40 can be conventional CRT based displays, liquid crystal displays (LCDs), plasma displays, image projectors, or other display types now known or later developed. It should be understood, that various output device(s) 212 may also be integrated via local interface 208 and/or via network interface device(s) 214 to other well-known devices such as plotters, printers, etc.

Local interface 208 may also be in communication with input/output devices that connect the respective computing devices 20, 40 to the network 15 (FIG. 1). These two-way communication devices include, but are not limited to, modulators/demodulators (modems), network-interface cards (NICs), radio frequency (RF) or other transceivers, telephonic interfaces, bridges, and routers. For simplicity of illustration, such two-way communication devices are represented by network interface(s) 214.

The memory 202 can include any one or a combination of volatile memory elements (e.g., random-access memory (RAM, such as dynamic RAM or DRAM, static RAM or SRAM, etc.)) and nonvolatile-memory elements (e.g., read-only memory (ROM), hard drive, tape drive, compact disc (CD-ROM), etc.). Moreover, the memory 202 may incorporate electronic, magnetic, optical, and/or other types of storage media now known or later developed. Note that the memory 202 can have a distributed architecture, where various components are situated remote from one another, such as in the various computing devices 20, 40 coupled to the network 15 (FIG. 1) that are accessible via firmware and/or software operable on the processor 200.

Memory 202 includes at least one program and/or image file. In the illustrated embodiment, memory 202 includes image enhancer 300. Each of the programs comprise an ordered listing of executable instructions for implementing logical functions. Furthermore, in the embodiment shown, memory 202 includes at least one operating system 204. The operating system 204 essentially controls the execution of other computer programs, such as the image enhancer 300 and other programs that may be executed by the computing devices 20, 40 of the IAES 10.

It should be understood that the image enhancer 300 can be implemented in software, firmware, hardware, or a combination thereof. The image enhancer 300, in the present example, can be a source program, executable program (object code), or any other entity comprising a set of instructions to be performed. Furthermore, image enhancer 300 is preferably written as (a) an object-oriented programming language, which has classes of data and methods, or (b) a procedure-programming language, which has routines, sub-routines, and/or functions. It will be well understood by one skilled in the art, after having become familiar with the teachings of the present invention, that image enhancer 300 may be written in a number of programming languages now known or later developed.

It will be understood by those having ordinary skill in the art that the implementation details of the image enhancer 300, as well as any image files stored within the memory 202 will differ based on the underlying technology used in implementing the image processing algorithms used by the IAES 10.

When the computing device 20, 40 is in operation, the processor 200 executes software stored in memory 202, communicates data to and from memory 202, and generally controls operations of the coupled input device(s) 210, output device(s) 212, and the network interface(s) 214 pursuant to the software. The image enhancer 300, the operating system 204, and any other applications are read in whole or in part by the processor 200, buffered by the processor 200, and executed.

When the image enhancer 300 is implemented in software, as shown in FIG. 2, it should be noted that the logic contained within the image enhancer 300 can be stored on any computer-readable medium for use by or in connection with any computer-related system or method. In the context of this document, a computer-readable medium is an electronic, magnetic, optical, or other physical device or means now known or later developed that can contain or store a computer program for use by, or in connection with a computer-related system or method.

Figure 3:
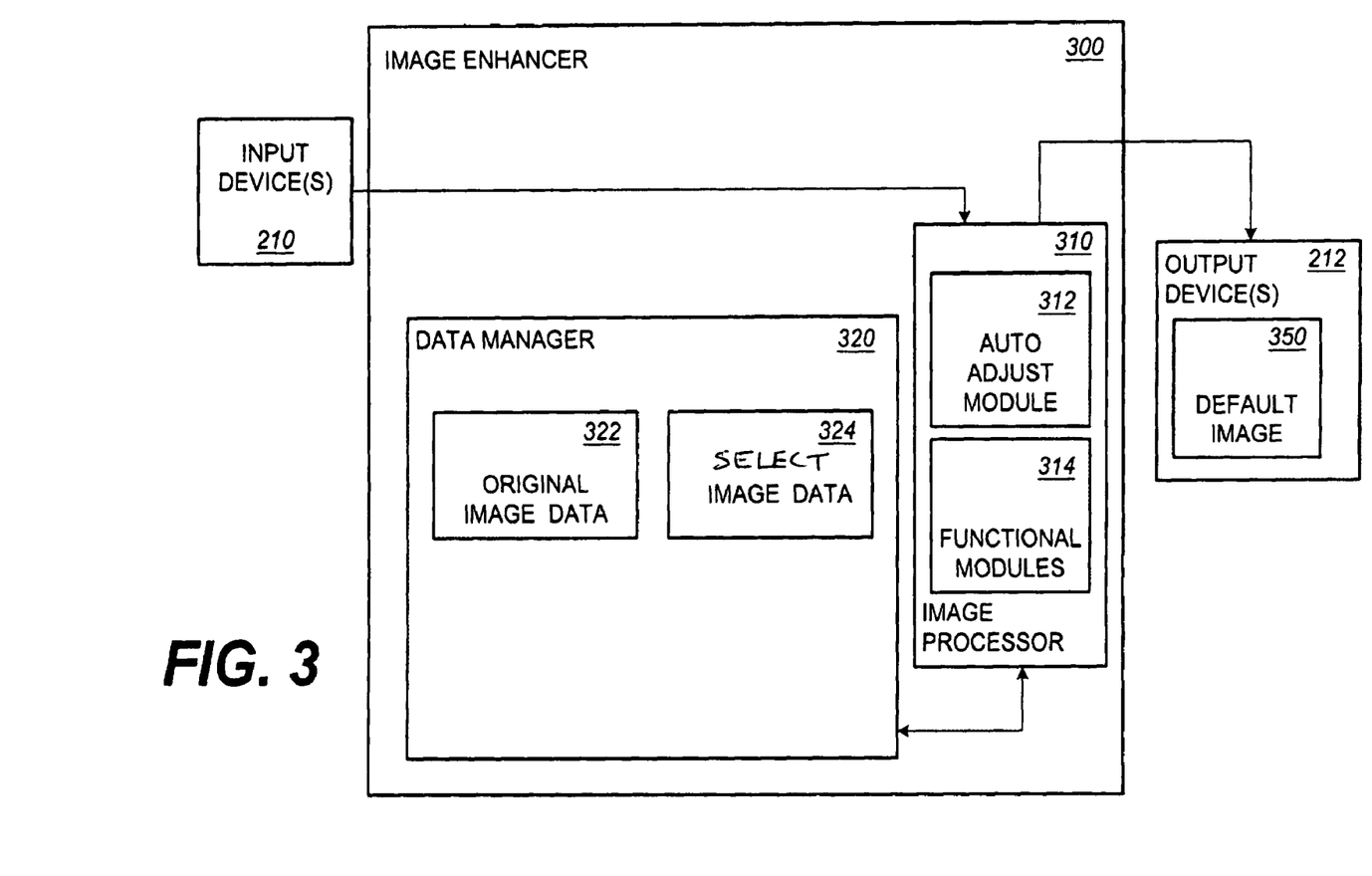
FIG. 3 is a functional block diagram illustrating an embodiment of the image enhancer of FIG. 2.

Reference is now directed to the functional-block diagram of FIG. 3, which illustrates an embodiment of the image enhancer 300 of FIG. 2. The image enhancer 300 comprises an image processor 310 and a data manager 320 that interacts with memory 202 or other distributed memory devices associated with the network 15 under the direction of one or more computing devices 20, 40, which are further directed by commands entered via input device(s) 210 to acquire and generate a modified image. In accordance with a preferred implementation, the embodiment illustrated in FIG. 3 depicts the image enhancer 300 without a user interface. Those having skill in the art will understand that the image enhancer 300 may include a user interface.

As illustrated in FIG. 3, the image processor 310 is in communication with the input device(s) 210, the data manager 320, and the output device(s) 212. The image processor 310 includes functional modules 314 (e.g., modules for color processing, contrast control, brightness, image-data compression, image-data manipulation, etc.) that enable the image processor 310 to manipulate the underlying pixel array that forms each image.

Data manager 320 is in communication with the image processor 310. The data manager 320 is configured to handle a plurality of images including the original-image data 322 (i.e., the acquired-raster image that includes a skewed-source object). When image processor 310 receives an indication from the data manager 320 that original-image data 322 is available for processing, image processor 310 buffers the original-image data 322 and determines the skew angle and the vertices of the source image in accordance with known methods of image analysis. The image processor 310 provides the skew angle and the coordinates of the source object to the auto-adjust module 312.

In turn, the auto-adjust module 312 determines the coordinates, which result in the largest orthogonal image that contains exclusively source-object information. The auto-adjust module 312 provides the image processor 310 with these coordinates of the orthogonal image. The image processor 310 uses those coordinates in an image-information cropping or editing routine to discard those portions of original-image data 322 that lie outside the coordinates or borders defined by auto-adjust module 312 to thereby identify the select-image data 324.

As illustrated in FIG. 3, select-image data 324 may be registered with data manager 320 and forwarded to output device(s) 212 as a default image 350 for observation of an operator of the computing devices 20, 40 (FIG. 1). The select-image data 324 can be used by the IAES 10 (FIG. 1) as a default image 350 for subsequent image editing, storage, further display, and/or distribution under the direction of the operator or logic executed by the computing devices 20, 40.

Figures 4A, 4B:
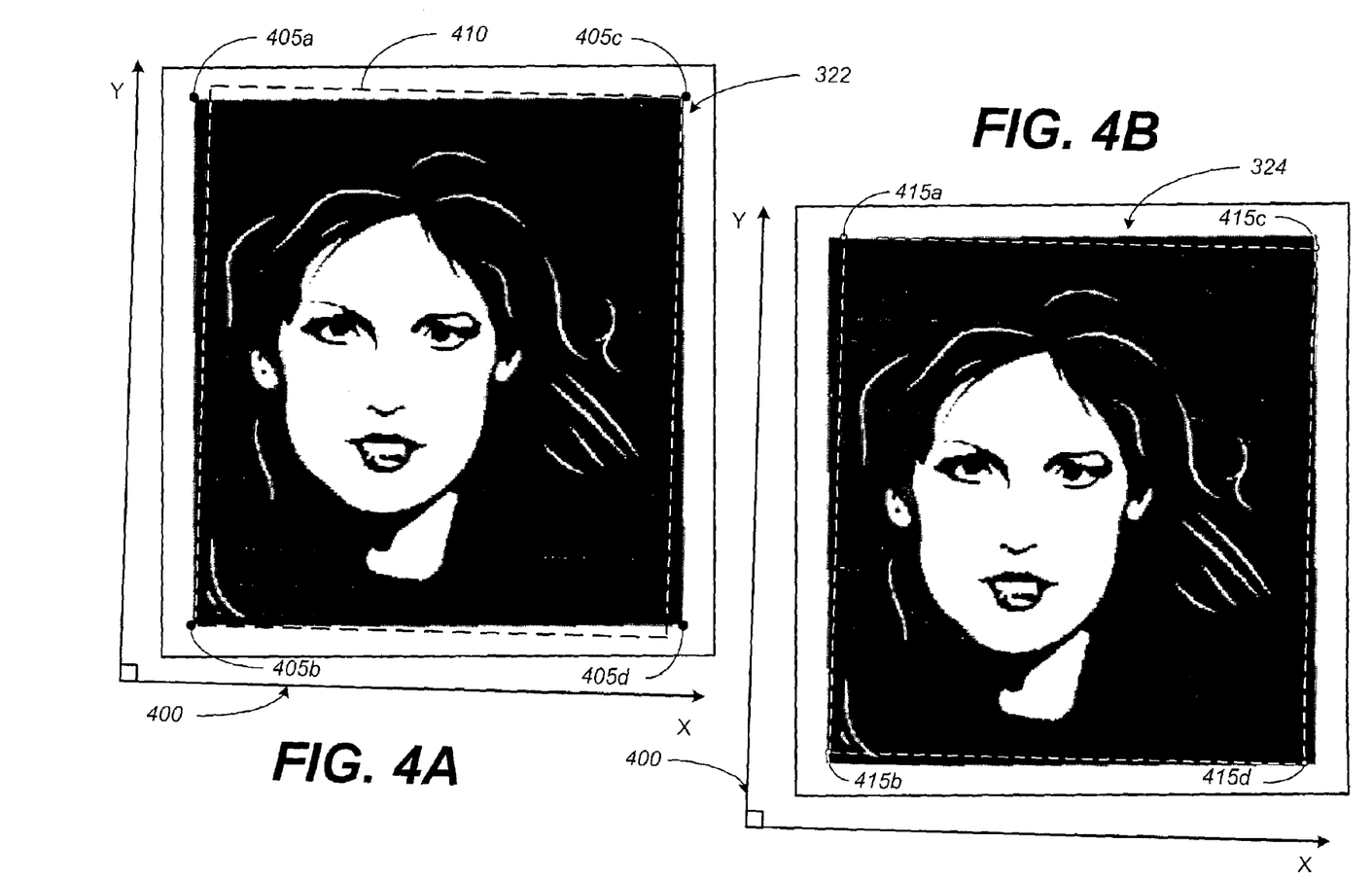
FIGS. 4A and 4B are schematic representations of an example image of a photograph acquired by the image acquisition and enhancement system of FIG. 1.

By way of example, original-image data 322 is illustrated in FIG. 4A in relationship with the two-dimensional raster coordinates used by image-processing devices within IAES 10. As shown, the two-dimensional raster coordinates are represented by an orthogonal-coordinate system 400 defined by an x-axis across the horizontal and a y-axis along the vertical range of the coordinate system 400. The original-image data 322 contains a source object, in this example, a photograph. The photograph is slightly misaligned or skewed in relation to the orthogonal coordinate system 400 as can be determined from an analysis of the relative positions of the corners of the photograph 405a, 405b, 405c, and 405d. Note that an image rectangle 410 (the dashed line in FIG. 4A) encompasses extraneous border information along both the top and the bottom edges of the original-image data 322.

After processing by the image enhancer 300, select-image data 324 is created and illustrated in FIG. 4B. The select-image data 324 is also shown in relation to the orthogonal-coordinate system 400. The select-image data 324 is defined by coordinates 415a, 415b, 415c, and 415d identified by the auto-adjustment module 312 of the image enhancer 300. A method for determining the adjusted coordinates given the original-image data coordinates 405 and the skew angle will be described in detail below.

Note that the underlying pixel information representing the photograph is not deskewed or aligned by the image enhancer 300. Consequently, the underlying information provided in the plurality of pixels remains unaltered from the pixel representation used to produce the original data image 322. As shown by the photograph of FIGS. 4A and 4B, a slight adjustment of the x-y coordinates from coordinates 405 of FIG. 4A to coordinates 415 in FIG. 4B (identifying the vertices of select-image data 324) effectively removes the extraneous border information present in image rectangle 410 from the select-image data 324. That portion of the example photograph (i.e., pixels) external to the select-image data 324, as shown in FIG. 4B, are not included in the select-image data by image enhancer 300.

Figure 5A:
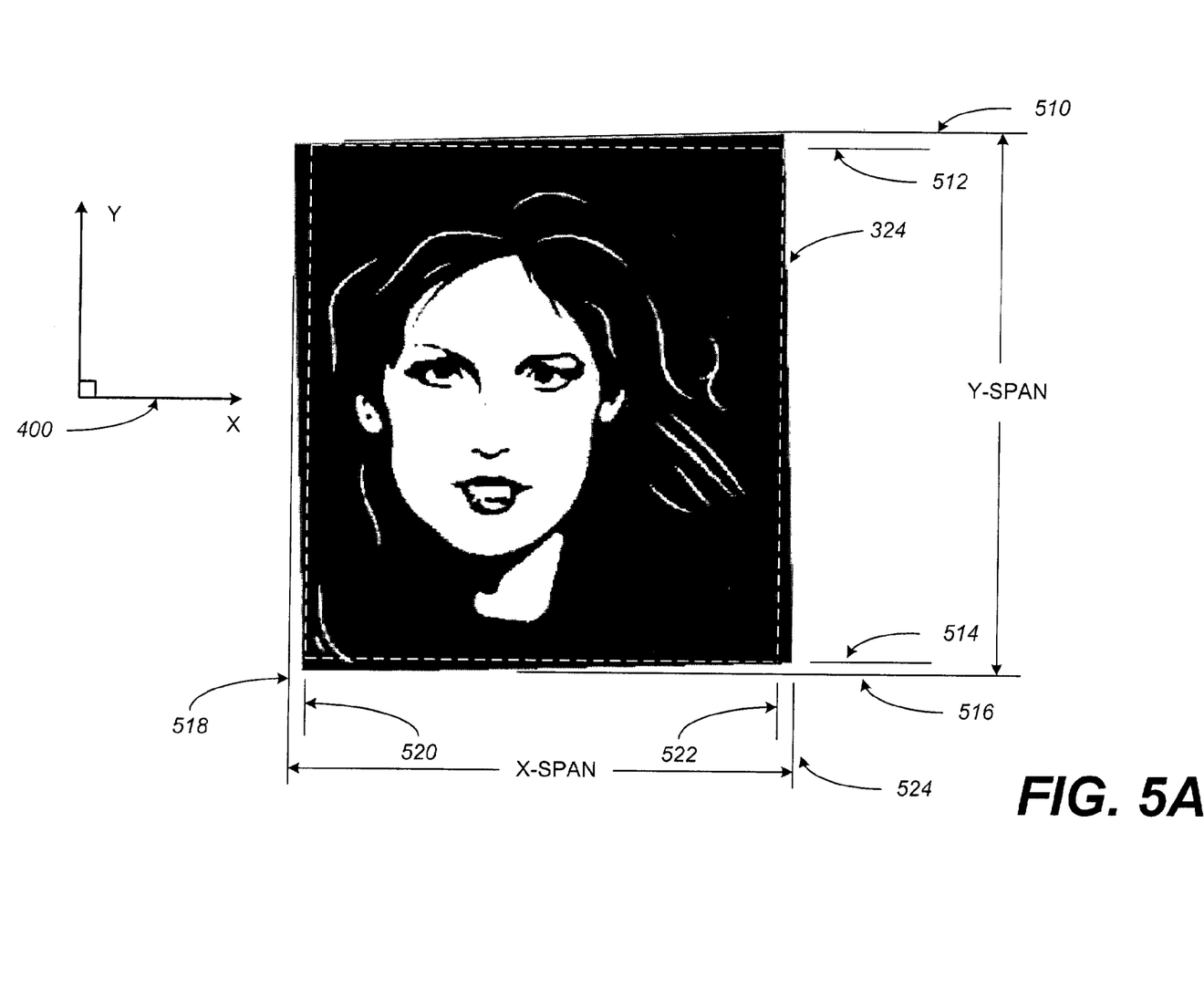
FIGS. 5A and 5B are schematic representations of the image of the photograph of FIGS. 4A and 4B with indicia of parameters that can be used to determine coordinates for cropping an image.
Figure 5B:
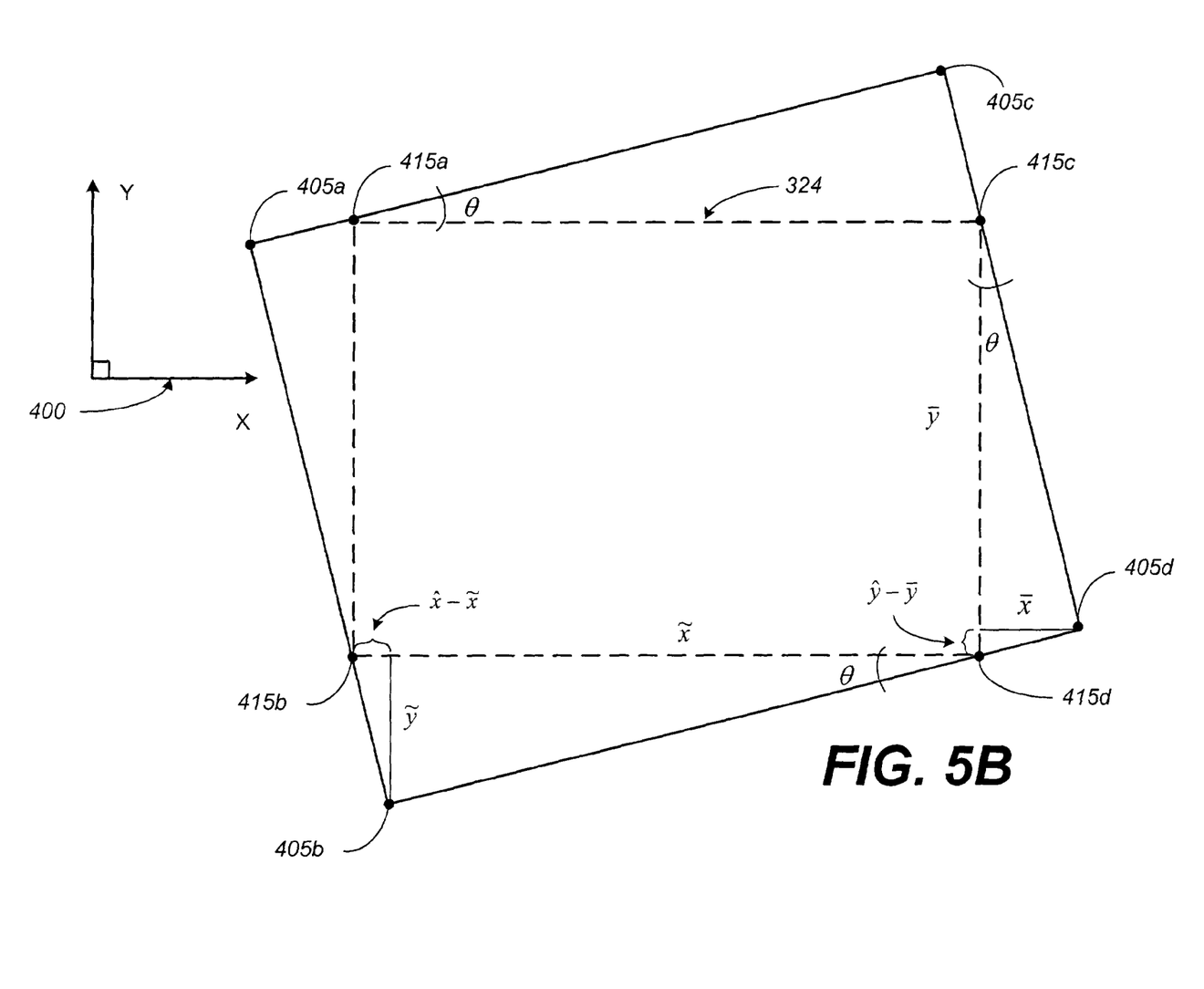

FIGS. 5A and 5B illustrate the determination of parameters that can be used to identify coordinates 415 for defining the boundaries of the orthogonal select-image data 324 given the skew angle and the boundary coordinates 405 of the skewed original-image data 322. Y-span is defined as the distance between the pixel having the y-coordinate with the greatest magnitude, illustrated as dimension line 510, to the y-coordinate with the lowest magnitude, illustrated as dimension line 516. Y-max 512 is the greatest magnitude of y-coordinates that are shared by pixels that contain image content from the photograph. Y-min 514 is the lowest magnitude of y-coordinates that are shared by pixels that contain image content from the photograph.

X-span is defined as the distance between the pixel having the x-coordinate with the lowest magnitude, illustrated as dimension line 518, to the x-coordinate with the greatest magnitude, illustrated as dimension line 524. X-min 520 is the lowest magnitude of x-coordinates shared by pixels that contain image content from the photograph. X-max 522 is the greatest magnitude of x-coordinates that are shared by pixels that contain image content from the photograph.

The x-coordinate defined by X-min 520 and the y-coordinate defined by Y-max 512 define coordinate 415a (FIG. 4B). The x-coordinate defined by X-min 520 and the y-coordinate defined by Y-min 514 define coordinate 415b (FIG. 4B). The x-coordinate defined by X-max 522 and the y-coordinate defined by Y-max 512 define coordinate 415c (FIG. 4B). The x-coordinate defined by X-max 522 and the y-coordinate defined by Y-min 514 define coordinate 415d (FIG. 4B).

Given X-min 520, X-max 522, Y-min 514 and Y-max 512, the X-span and the Y-span can be determined from the following equations:

$$X_{span} = X_{max} - X_{min} \quad \text{Eq. 1}$$

$$Y_{span} = Y_{max} - Y_{min} \quad \text{Eq. 2}$$

Given the skew angle, θ, (in the following equations, the skew angle is defined as a positive angle for the trigonometric analysis—if the actual skew angle is less than zero, then the value of K below should be defined as $$K = \left( \frac{-2|\tan\theta|}{1 + \tan^2\theta} \right)$$

to ensure that the appropriate values for $\hat{x}$ and $\hat{y}$ are obtained in Eq. 17) and introducing the line segments identified in FIG. 5B, the following four relationships identify the tangent of the skew angle, θ.

$$\tan\theta = \frac{(\hat{x} - \tilde{x})}{\tilde{y}} \qquad \text{Eq. 3}$$

$$\tan\theta = \frac{\tilde{y}}{\tilde{x}} \qquad \text{Eq. 4}$$

$$\tan\theta = \frac{(\hat{y} - \overline{y})}{\overline{x}} \qquad \text{Eq. 5}$$

$$\tan\theta = \frac{\overline{x}}{\overline{y}} \qquad \text{Eq. 6}$$

where: $\hat{x}$ is the distance between the minimum and the maximum x-pixel coordinates of the select-image data 324; $\hat{y}$ is the distance between the minimum and the maximum y-pixel coordinates of the select-image data 324; $\tilde{x}$ is the distance between the maximum x-pixel coordinate associated with the original-image data 322 and the maximum x-pixel coordinate associated with the select-image data (i.e., the distance between the right-hand border of the select image data 324 and the x-coordinate defining corner 405*d* in the skewed photograph); $\tilde{y}$ is the distance between the minimum y-pixel coordinate associated with the original-image data 322 and the minimum y-pixel coordinate associated with the select-image data 324 (i.e., the distance between the lower border of the select image data 324 and the y-coordinate defining corner 405*b* in the skewed photograph); $\overline{y}$ is the distance between the maximum y-pixel coordinate associated with the select-image data 324 and the y-pixel coordinate associated with the maximum x-pixel coordinate of the original-image data 322 (i.e., the distance along the right-hand border of the select image data 324 above the x-coordinate defining corner 405*d* in the skewed photograph); and $\overline{x}$ is the distance between the maximum x-pixel coordinate associated with the select-image data 324 and the x-pixel coordinate associated with the minimum y-pixel coordinate associated with the original-image data 322 (i.e., the distance along the lower border of the select image data 324 to the right of the x-coordinate defining the left-hand border of the select-image data 324.

Then, the following relationships can be used to define $\hat{x}$ and $\hat{y}$, respectively.

$$\hat{x} = X_{span} - 2\tilde{x} \qquad \text{Eq. 7}$$

$$\hat{y} = Y_{span} - 2\tilde{y} \qquad \text{Eq. 8}$$

However, it is desired to determine $\hat{x}$ and $\hat{y}$ as functions of the skew angle, $\theta$. For example, it is desired to find:

$$\begin{bmatrix} \hat{x} \\ \hat{y} \end{bmatrix} = \begin{bmatrix} M_{11} & M_{12} \\ M_{21} & M_{22} \end{bmatrix} \begin{bmatrix} X_{span} \\ Y_{span} \end{bmatrix},$$

where $M_{ij}=f(\theta)$ and where $M_{ij}$ is solely dependent on $\theta$. Re-arranging equations 3 through 6 results in the following:

$$\tilde{y} \tan\theta = (\hat{x} - \tilde{x}) \qquad \text{Eq. 3}$$

$$\tilde{x} \tan\theta = \tilde{y} \qquad \text{Eq. 4}$$

$$\overline{x} \tan\theta = (\hat{y} - \overline{y}) \qquad \text{Eq. 5}$$

$$\overline{y} \tan\theta = \overline{x} \qquad \text{Eq. 6}$$

Equations 3 and 4 can be combined, as follows, to reveal the following variations of equation 7.

$$\tilde{x}\tan^2\theta = (\hat{x} - \tilde{x}) \text{ or } \tilde{x}(1+\tan^2\theta) = \hat{x} \qquad \text{Eq. 9}$$

Similarly, equations 5 and 6 can be combined to reveal the following variations of equation 8.

$$\overline{y}\tan^2\theta = (\hat{y} - \overline{y}) \text{ or } \overline{y}(1+\tan^2\theta) = \hat{y} \qquad \text{Eq. 10}$$

Inserting equations 7 and 8 into equations 9 and 10, to eliminate $\tilde{x}$ and $\overline{y}$ results in $$\hat{x} = X_{span} - 2\tilde{x} = X_{span} - 2\overline{y}\tan\theta,$$

using equation 6, $$\hat{x} = X_{span} - 2\tan\theta\left(\frac{\hat{y}}{1+\tan^2\theta}\right) \text{ or} \qquad \text{Eq. 11}$$

$$\hat{x} = X_{span} + \hat{y}\left(\frac{-2\tan\theta}{1+\tan^2\theta}\right)$$

and $$\hat{y} = Y_{span} - 2\tilde{y} = Y_{span} - 2\tilde{x}\tan\theta,$$

using equation 4, $$\hat{y} = Y_{span} - 2\tan\theta\left(\frac{\hat{x}}{1+\tan^2\theta}\right) \text{ or} \qquad \text{Eq. 12}$$

$$\hat{y} = Y_{span} + \hat{x}\left(\frac{-2\tan\theta}{1+\tan^2\theta}\right).$$

If K is substituted for the ratio within the parentheses of equations 11 and 12, then, $$\left(\text{note again that } K = \left(\frac{-2|\tan\theta|}{1+\tan^2\theta}\right)\right)$$

$$\hat{x} = X_{span} + \hat{y}K \qquad \text{Eq. 13}$$

and $$\hat{y} = Y_{span} + \hat{x}K. \qquad \text{Eq. 14}$$

Substituting equation 14 into equation 13, results in $$\hat{x} = X_{span} + \hat{y}(Y_{span} + K\hat{x}) \qquad \text{Eq. 15}$$

Therefore, $$\hat{y} = Y_{span} + \left(\frac{X_{span} + KY_{span}}{1-K^2}\right)K \text{ or} \qquad \text{Eq. 16}$$

$$\hat{y} = Y_{span} + \frac{K}{1-K^2}X_{span} + \frac{K^2}{1-K^2}Y_{span} \text{ or}$$

$$\hat{y}(1-K^2) = Y_{span} + KX_{span}.$$

Rearranging equations 15 and 16, results in the desired function of $\theta$ as follows:

$$\begin{bmatrix} \hat{x} \\ \hat{y} \end{bmatrix} = \begin{bmatrix} \frac{1}{1-K^2} & \frac{K}{1-K^2} \\ \frac{K}{1-K^2} & \frac{1}{1-K^2} \end{bmatrix} \begin{bmatrix} X_{span} \\ Y_{span} \end{bmatrix}. \qquad \text{Eq. 17}$$

Note, $1-K^2=0$, when $$1 - \left[ \frac{4\tan^2\theta}{(1+\tan^2\theta)^2} \right] = 0,$$

which occurs for $\theta=45$ degrees. Finally, the following equations can be applied to solve for the coordinates 415:

$$X_{min} = \frac{X_{span} - \hat{x}}{2}, \qquad \text{Eq. 18}$$

$$X_{max} = X_{min} + \hat{x}, \qquad \text{Eq. 19}$$

$$Y_{min} = \frac{Y_{span} - \hat{y}}{2}, \text{ and} \qquad \text{Eq. 20}$$

$$Y_{max} = Y_{min} + \hat{y}. \qquad \text{Eq. 21}$$

Figure 6:
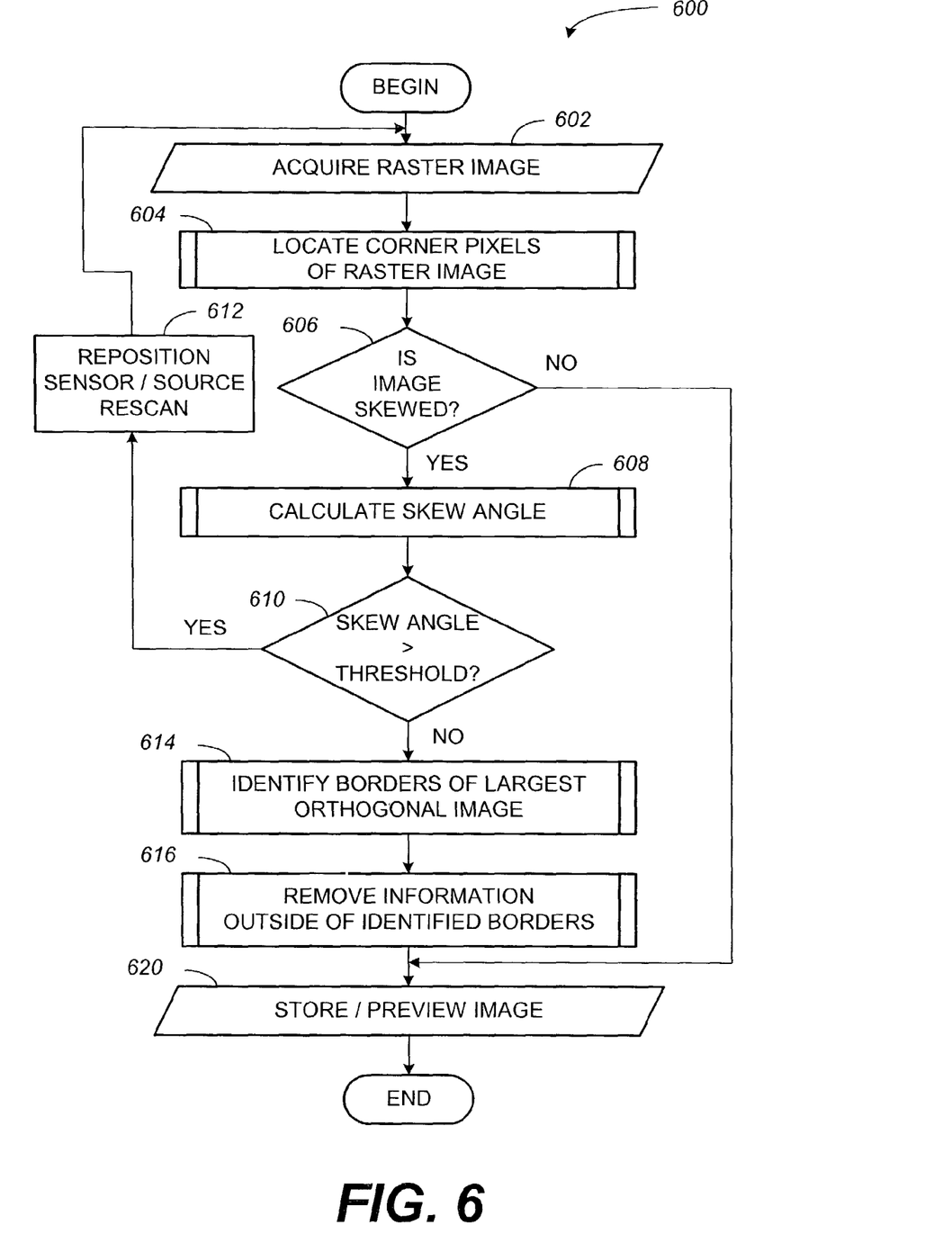
FIG. 6 is a flow diagram illustrating an embodiment of a representative method for manipulating a scanned image that can be implemented by the image acquisition and enhancement system of FIG. 1.

FIG. 6 illustrates an embodiment of a method for presenting a representation of a source object. As illustrated, method 600 begins with step 602, where a computing device 20, 40 associated with IAES 10 acquires a raster image. In step 604, the computing device 20, 40 locates the corner pixels of the source object within the plurality of pixels produced by the image-acquisition device (e.g., scanner 23). As described above, it is often the case that an operator of FAES 10 desires to scan a photograph or other source object that is smaller than the available scan or sensor region of the image-acquisition device. Next, in step 606, the computing device 20, 40 is programmed to determine if the source object within the acquired image is skewed. When the result of the query of step 606 is negative, the computing device 20, 40 is programmed to bypass step 608 through 616 as illustrated by the negative flow-control arrow labeled "NO" exiting step 606. Otherwise, the computing device 20, 40 is programmed to proceed to calculate the skew angle as indicated in step 608.

Once the skew angle is calculated in step 608, the computing device 20, 40 is programmed to compare the skew angle to a threshold in the query of step 610. When the comparison indicates that the skew angle exceeds the threshold, the computer 20, 40 is programmed to prompt an operator to reposition the source and/or to reacquire the image as indicated in step 612. After repositioning and/or reacquiring the image, the computing device 20, 40 repeats steps 602 through 610. Otherwise, when it is determined that the skew angle does not exceed the threshold, the computing device 20, 40 is programmed to identify the borders of the largest orthogonal image that contains pixels that include information from the source object as indicated in step 614. Thereafter, in step 616, the computing devices 20, 40 remove information external to the identified borders to generate a default image. Next, in step 620, the computing devices 20, 40 store and/or display the default image 350 generated from the select-image dataselect-image dataselect-image data 324.

Any process descriptions or blocks in the flow diagram of FIG. 6 should be understood as representing modules, segments, or portions of code which include one or more executable instructions for implementing specific logical functions or steps in the process for presenting a representation of a source object. Alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

We claim:

1. An image-processing system, comprising:
   an image-acquisition device configured to generate a representation of a source object, the representation comprising a plurality of pixels;
   a processor communicatively coupled to the image-acquisition device; and
   a memory element communicatively coupled to the processor, the memory element comprising:
      logic configured to determine when the source object is skewed in the representation; and
      logic configured to identify the borders of an orthogonal portion of the representation responsive to the logic configured to determine, wherein the orthogonal portion comprises unaltered pixels that contain information corresponding to the source object.

2. The system of claim 1, further comprising logic configured to crop those portions of the representation external to the orthogonal portion to generate a select image.

3. The system of claim 1, further comprising a display device communicatively coupled to the processor.

4. The system of claim 1, wherein the processor can selectively bypass execution of the logic configured to determine when the source object is skewed.

5. The system of claim 1, wherein the logic configured to identify is applied when a skew angle threshold is exceeded.

6. The system of claim 1, further comprising logic configured to prompt an operator of the system to generate a replacement representation of the source object in response to a skew angle that exceeds a skew angle threshold.

7. A method for presenting a representation of a source object, the method comprising:
   acquiring a representation of a source object, the representation formed by a plurality of pixels;
   identifying the vertices of the source object within the representation;
   determining if the representation is skewed;
   calculating a skew angle in response to determining that the representation is skewed; and
   deriving the borders of the largest orthogonal portion of the representation that comprises unaltered pixels corresponding to the source object.

8. The method of claim 7, further comprising ignoring pixels that are external to the borders.

9. The method of claim 7, further comprising displaying the unaltered pixels.

10. The method of claim 7, further comprising performing a data manipulation comprising the unaltered pixels.

11. The method of claim 7, further comprising:
   comparing the skew angle with a threshold prior to deriving the borders; and repeating the steps of acquiring, identifying, and determining when comparing indicates the skew angle exceeds the threshold.

12. The method of claim 11, wherein comparing the skew angle with a threshold further comprises comparing the skew angle with a predetermined threshold.

13. The method of claim 11, wherein comparing the skew angle with a threshold further comprises comparing the skew angle with an operator-adjustable threshold.

14. The method of claim 7, wherein identifying comprises determining coordinates that define a parallelogram.

15. A computer-readable medium having a program for automatically generating a default image, the program comprising:
 logic configured to receive a representation of a source object;
 logic configured to identify the borders of the source object within the representation;
 logic configured to determine when the borders of the source object within the representation are nonorthogonal with the default orientation of an image processing system;
 logic, responsive to the logic configured to determine, configured to identify the largest orthogonal portion of the representation, wherein the largest orthogonal portion of the representation encompasses only unaltered pixels corresponding to the source object.

16. The computer-readable medium of claim 15, further comprising logic configured to communicate a location associated with the vertices of the largest orthogonal portion.

17. The computer-readable medium of claim 16, wherein the logic configured to communicate generates the relative position of the vertices of the largest orthogonal portion.

18. The computer-readable medium of claim 15, wherein the logic configured to identify the largest parallelogram is responsive to a skew angle.

19. The computer-readable medium of claim 18, wherein the skew angle is less than a predetermined threshold.

20. An image-processing system, comprising:
 means for determining when a source object in a representation is skewed;
 means for calculating a skew angle responsive to the means for determining; and
 means for identifying the largest orthogonal portion of the representation that exclusively within the source object.

21. The system of claim 20, further comprising means for presenting the largest orthogonal portion of the representation as a default image.

22. The system of claim 20, wherein the means for identifying the largest orthogonal portion of the representation is responsive to a comparison of the skew angle and a threshold preference.

* * * * *

UNITED STATES PATENT AND TRADEMARK OFFICE
CERTIFICATE OF CORRECTION

PATENT NO. : 7,068,855 B2  
APPLICATION NO. : 10/197928  
DATED : June 27, 2006  
INVENTOR(S) : Steven J. Simske et al.

It is certified that error appears in the above-identified patent and that said Letters Patent is hereby corrected as shown below:

In column 11, line 41, delete "FAES" and insert -- IAES --, therefor.

In column 12, line 22, in Claim 1, delete "device;" and insert -- device, --, therefor.

In column 13, lines 20-21, in Claim 15, delete "nonorthogonal" and insert -- non-orthogonal --, therefor.

Signed and Sealed this

Twelfth Day of May, 2009

JOHN DOLL  
*Acting Director of the United States Patent and Trademark Office*